INVENTORS A. H. BOBECK
E. DELLA TORRE
H. E. D. SCOVIL
BY Herbert M. Shapiro
ATTORNEY

June 2, 1970 A. H. BOBECK ET AL 3,516,077

MAGNETIC PROPAGATION DEVICE WHEREIN POLE PATTERNS
MOVE ALONG THE PERIPHERY OF MAGNETIC DISKS

Filed May 28, 1968 2 Sheets-Sheet 2

United States Patent Office 3,516,077
Patented June 2, 1970

3,516,077

MAGNETIC PROPAGATION DEVICE WHEREIN POLE PATTERNS MOVE ALONG THE PERIPHERY OF MAGNETIC DISKS

Andrew H. Bobeck, Chatham, Edward Della Torre, Plainfield, and Henry E. D. Scovil, New Vernon, N.J., assignors to Bell Telephone Laboratories, Incorporated, Murray Hill and Berkeley Heights, N.J., a corporation of New York Filed May 28, 1968, Ser. No. 732,644
Int. Cl. G11c *11/14, 19/00*
U.S. Cl. 340—174 6 Claims

ABSTRACT OF THE DISCLOSURE

Patterns of magnetic material contiguous the surface of a sheet of material in which single wall domains can be propagated have been found to provide magnetic pole patterns which change in response to a field rotating in the plane of the sheet. The changing pole patterns provide attracting propagation fields for moving single wall domains in the sheet from input to output positions thus permitting shift register operation in the absence of discrete propagation conductors. An arrangement wherein the pole patterns move along the periphery of magnetic disks is described. Next adjacent disks are disposed on opposite surfaces of the sheet and domains are guided for movement along the periphery of the disks by a magnetic guide line. Domain propagation in only selected propagation channels is achieved by providing disks of different geometry in each channel for regulating the pole strengths in response to the rotating fields.

FIELD OF THE INVENTION

This invention relates to domain propagation devices and, more particularly, to devices in which single wall domains are propagated in a sheet of magnetic material.

BACKGROUND OF THE INVENTION

A single wall domain is a reverse-magnetized region encompassed by a domain wall which closes on itself to form, illustratively, a cylindrical geometry the diameter of which is a function of the material parameters. Inasmuch as the boundary of the domain is independent of the boundary of the sheet, multidimensional movement of the domain can be realized.

A simple convention permits the visualization of a single wall domain. Most sheets of material in which a single wall domain can be moved are characterized by a preferred direction of magnetization along an axis normal to the plane of the sheet. We may designate as positive and negative the directions for magnetization up out of and down into the plane of the sheet along that axis respectively. A single wall domain in this context may be visualized as an encircled plus sign and the magnetization in the remainder of the sheet may be represented by minus signs.

The Bell System Technical Journal (BSTJ), vol. 6, No. 8, October 1967, pages 1901 et seq., describes single wall domains, various operations employing the movement of single wall domains, and suitable materials in which those domains can be moved.

Selective movement of a single wall domain is realized by the generation of a localized attracting field (viz., field gradient) at a position offset from the position occupied by a domain. In accordance with the assumed convention, a discrete conductor in the form of a loop coupled to a position offset from that occupied by a domain generates an appropriately placed positive field (up out of the plane) when pulsed. The domain moves to the position of that loop.

When an attempt is made to miniaturize single wall domain devices, it is realized that single wall domains can be obtained with diameters far smaller than the smallest geometry realizable for the circuitry required to move them. There are a variety of reasons for this. The loop shape geometry of the propagation conductors, for example, occupies more space than say a single conductor. Moreover, drive wiring economy and the need to provide directionality in the propagation channels necessitate three-phase propagation pulsing as is well understood. Consequently, only one position in three is occupied by a domain in practice although those positions may overlap one another. Further, drive current requirements dictate minimum cross sections for conductors. But photo deposition techniques do not permit closely spaced conductors to have disproportionate widths and thicknesses without risking short circuits between adjacent conductors. As a result, as much as ten mils is allocated per bit location, yet domains of the order of microns can be realized.

An object of this invention is to provide a domain propagation device in which single wall domains can be propagated in the absence of propagation conductors.

BRIEF DESCRIPTION OF THE INVENTION

The invention is based on the discovery that a variety of magnetic patterns of, for example, permalloy, on the surfaces of sheets of magnetic material in which single wall domains can be moved, exhibit changing magnetic pole patterns in response to a field rotating in the plane of that sheet. It has been found further that those patterns can be chosen such that single wall domains can be made to follow those changing pole patterns from input to output positions in the absence of discrete propagation conductors.

In one embodiment, disks of permalloy are deposited so that alternate ones of the disks are on opposite surfaces of a suitable magnetic sheet. In response to a "transverse" field rotating through 360 degrees to consecutive discrete orientations in the plane of the magnetic sheet, domains are made to follow next consecutive peripheries of those disks. A permalloy guide may be employed to insure that the domains do not stray from the desired path.

It has been found, further, that the magnetic pole strength in each disk of a disk pattern is a function of the disk geometry and that domains may be moved in only selected channels in response to a rotating transverse field by making, for example, the disk thickness different for each channel.

A feature of this invention is a domain propagation device including a magnetic sheet in which single wall domains can be moved, spaced apart magnetic disk patterns, the disks of each pattern being disposed on both surfaces of that sheet for supporting changing magnetic pole patterns in response to a rotating transverse field, and means for generating a transverse field rotating from one discrete orientation to another through 360 degrees in the plane of the sheet.

Another feature of this invention is a domain propagation device including a magnetic sheet in which single wall domains can be moved, first and second spaced apart magnetic disk patterns, the disks of each pattern being disposed on both surfaces of the sheet for supporting changing magnetic pole patterns in response to a rotating transverse field wherein the disks of the first and second patterns have geometries to provide different pole strengths in response to a like transverse field, and means for generating a transverse field rotating from one discrete orientation to another through 360 degrees in the plane of the sheet.

DETAILED DESCRIPTION

Figure 1:
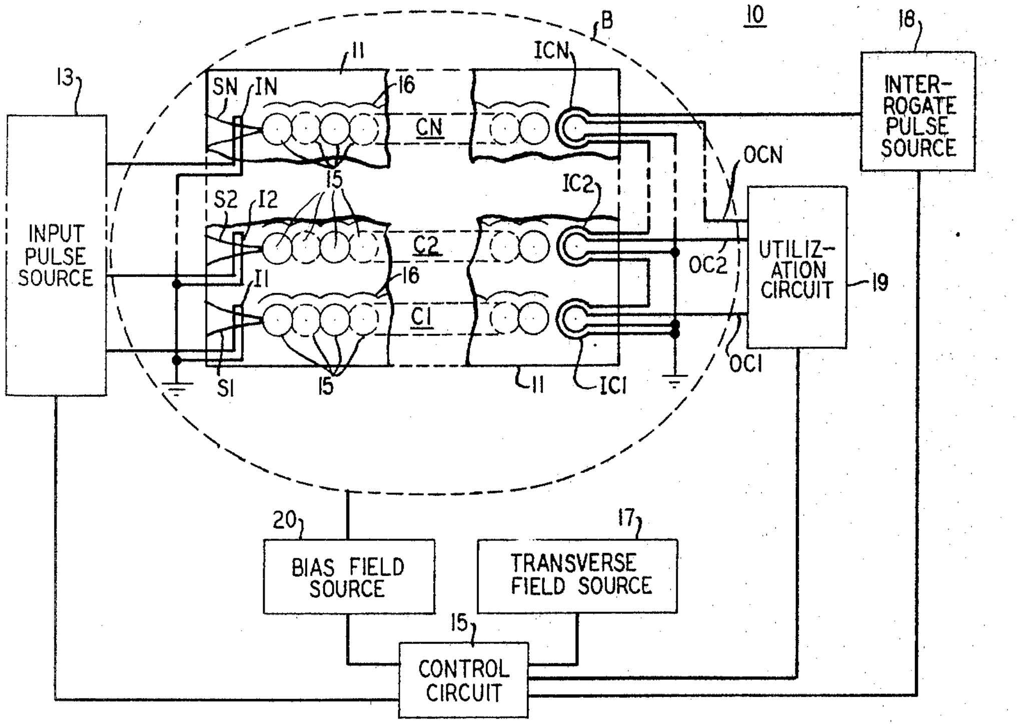
FIG. 1 is a schematic illustration of an arrangement in accordance with this invention.

FIG. 1 shows a domain propagation arrangement 10 in accordance with this invention. The arrangement includes a sheet of magnetic material 11 in which single wall domains can be moved.

A plurality of channels, C1, C2 . . . CN, for domain propagation are defined in sheet 11.

Input positions for the channels are defined by sources S1, S2 . . . SN. The sources are regions of positive magnetization the shapes of which may be maintained constant by conductors (not shown) outlining the sources and having an appropriately poled current flowing therein. Such an arrangement is described in copending application Ser. No. 579,931, filed Sept. 16, 1966 for A. H. Bobeck, U. F. Gianola, R. C. Sherwood and W. Shockley.

Hairpin-shaped input conductors I1, I2 . . . IN overlie correspondingly designated sources in a manner to sever from those sources small portions thereof when the conductors are pulsed to generate a field which is negative between the legs of the hairpin for the convention adopted herein. The input conductors are connected between an input pulse source 13 and ground.

The propagation channels C for domains severed from sources S are defined illustratively by patterns of magnetic disks. The material for the disks may comprise any soft magnetic material such as permalloy. FIG. 1 shows a plurality of such permalloy disks 15 offset from one another along a propagation channel. Alternate ones of the disks are on opposite surfaces of sheet 11. The disks on one surface are shown as circles; those on the other surface are shown as broken circles.

A permalloy guide 16 is shown spaced apart from the disks on one surface in FIG. 1. The guide operates to provide a convenient flux closure for flux in a domain wall encompassing a domain. A minimum energy condition inheres when a domain wall is positioned with respect to the guide such that material of the guide lies to each side of the wall. Consequently, the guide acts to constrain the movement of a domain. A domain introduced between the guide 16 and the leftmost disk as shown in FIG. 1 moves to the right therebetween in response to a clockwise rotating transverse field.

A domain is moved along a channel by following the most highly attracting pole concentrations generated in the permalloy disks by a rotating transverse field.

Figure 2:
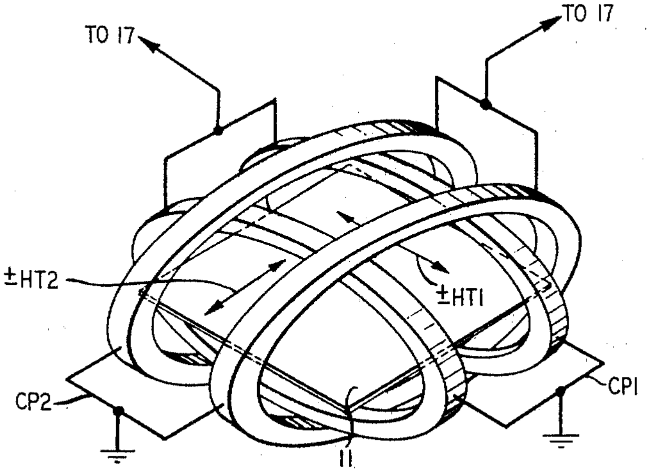
FIG. 2 is a schematic illustration of a portion of the arrangement of FIG. 1.

The rotating transverse field is generated, illustratively, by pairs of Helmholtz coils CP1 and CP2 arranged as shown in FIG. 2. When coil pair CP1 is activated, either a positive or a negative field ±HT1 is generated. This field and the orientation thereof are indicated by the double-headed arrow designated ±HT1 in FIG. 2. When coil pair CP2 is activated, again either a positive or negative field is generated as indicated by the double-headed arrow designated ±HT2 in FIG. 2. But the latter field is perpendicular to the field generated by coil pair CP1. The coils are activated to provide the fields consecutively at 90 degrees to one another in the illustrative arrangement. The Helmholtz coils are connected between a "transverse field" source 17 and ground as shown in FIGS. 1 and 2. Source 17 is taken to include switching apparatus for properly activating the coil pairs consecutively. It should be clear that the requisite "rotating" transverse field need not be rotating continuously but may comprise consecutive fields at discrete orientations angularly displaced with respect to one another through 360 degrees in the plane of sheet 11. A magnetometer may be adapted to provide suitable continuously rotating fields.

FIGS. 3A through 3D show the movement of a domain along a permalloy pattern which defines a representative channel C1 of FIG. 1. FIGS. 4A through 4D show arbitrary transverse field orientations for the domain positions in correspondingly lettered FIG. 3.

Figure 3A:
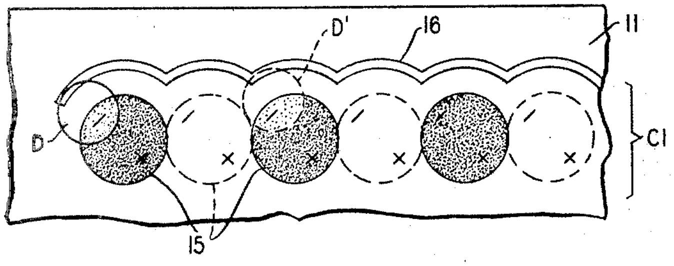
FIGS. 3A–3D are schematic illustrations of consecutive pole configurations and domain positions in response to transverse fields in accordance with this invention.
Figure 4A:
FIGS. 4A–4D are schematic representations of the orientations of a transverse field during operation for generating the pole patterns shown in FIGS. 3A–3D.

FIG. 3A shows a domain D centered about a minus sign on the periphery of a permalloy disk 15. It may be seen that all permalloy disks in the figure have plus and minus signs at opposite edges thereof. The plus and minus signs represent most intense magnetic pole concentrations generated by the transverse magnetic field −HT1 represented by an arrow so designated, as shown in FIG. 4A. We will assume that the fields, generated by the coils of FIG. 2, are being rotated (viz., generated at discrete consecutive orientations) clockwise as indicated by the curved undesignated arrows in FIGS. 4A through 4D.

FIG. 4A shows the arrow −HT1 initially directed downward and to the right. The most intense pole concentrations in channel C1 appear in opposite positions on the periphery of the disks as shown by the plus and minus signs in FIG. 3A. The domain D occupies the position of the minus sign for a disk on the top surface of sheet 11 in accordance with the convention employed herein. The domain will be seen to occupy the position of a plus sign, of course, when the disk is on the opposite surface of sheet 11.

Figure 3B:
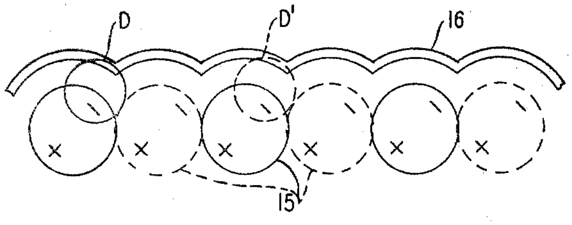
Figure 4B:
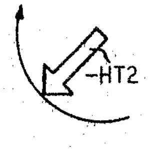

FIG. 4B shows the transverse field (−HT2) in an orientation downward and to the left as indicated by the arrow designated −HT2 in the figure. The positions of the most intense pole concentrations are as shown in FIG. 3B. The domain D moves accordingly.

Figure 3C:
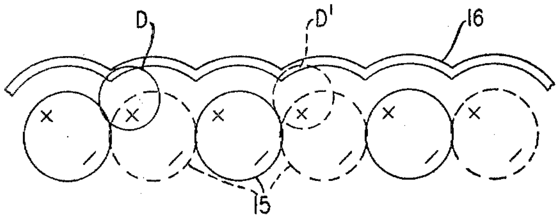
Figure 4C:
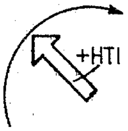
Figure 3D:
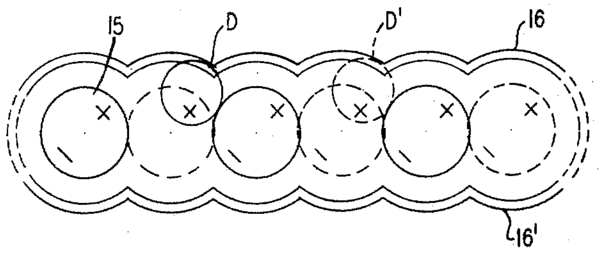
Figure 4D:
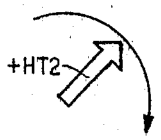

FIG. 4C shows the transverse field (+HT1) directed upward and to the left. The domain D moves further to the right as shown in FIG. 3C. The domain can be seen to be centered on a plus sign in FIG. 3C. The associated disk, however, is on the bottom surface of sheet 11. A plus sign on a disk disposed on the bottom surface of sheet 11 represents an attracting field for the convention adopted FIG. 4D shows the field (+HT2) directed upward and to the right. The resulting pole configuration and domain position are shown in FIG. 3D.

A comparison between FIGS. 3A, 3B, 3C, and 3D shows that domain D moves to the right as the transverse field rotates clockwise. It is to be appreciated that that same domain would move to the left if the transverse field is rotated counterclockwise. Of course, a domain moves to the left in the presence of a clockwise rotating transverse field if it follows the track defined between a guide 16' and the disks 15 shown in FIG. 3D. A recirculating propagation channel may be provided conveniently by this latter implementation. The guide 16 or 16' constrains the domain, in either case, to follow the periphery of the disks 15. No such constraint is necessary about the terminal disks of a channel as indicated by the broken curved lines connecting guides 16 and 16' because a transfer of a domain is not wanted at the terminal disks and a domain there merely follows the moving poles.

All domains in a channel move synchronously in response to the rotating transverse fields. For example, a glance at FIG. 3A indicates that a domain may occupy each position where a minus sign is shown and all minus signs move synchronously in response to the rotating fields.

The input circuitry is synchronized with the transverse field for introducing domains at a proper time. As an example, a domain may be introduced to the position of the leftmost minus sign as shown in FIG. 3A when the next preceding domain is in the position marked by the broken circle D' in that figure. Sources 13 and 17 are connected to a control circuit 15 of FIG. 1 in order to provide the necessary synchronization.

Of course, an input pulse on conductor I1 of FIG. 1 may be absent when an appropriate time for introducing a domain into channel C1 is provided. In such a circumstance, no domain is provided. But this absence of a domain is propagated, as are domains, along the propagation channel. The absence of a domain may be visualized as the broken circle D' shown in each of FIGS. 3A through 3D. The presence and absence of domains may be taken to represent a binary one and a binary zero respectively. The information represented by the presence and absence of domains is, therefore, propagated along propagation channels, in response to consecutive rotations of the transverse fields, to associated output positions.

The output positions are defined by interrogate conductors IC1, IC2 . . . ICN. Each interrogate conductor includes a loop which couples, illustratively, at last position which a domain can occupy in a channel. The interrogate conductors are conveniently connected electrically in series between an interrogate pulse source 18 and ground and operate to collapse domains in the so coupled positions when pulsed.

Output conductors OC1, OC2 . . . OCN are also coupled to the output positions. Each output conductor is connected between a utilization circuit 19 and ground. When a pulse in the interrogate conductor collapses a domain in an output position, the associated output conductor applies a pulse to the utilization circuit. The interrogate pulses are applied and the utilization circuit is enabled in synchronism with the rotations of the transverse field. Source 18 and circuit 19 are connected to control circuit 15 for the proper control.

The input, propagation, and detection of information represented by the presence and absence of domains has now been described.

It is to be made clear that the domains so moved have diameters determined by a bias field substantially normal to sheet 11 and of a polarity to contract domains. A block 20 in FIG. 1 represents the bias field source (and is so designated). The source may comprise a coil positioned in the plane of sheet 11 conveniently along a path defined by broken circle B for generating the appropriate field. Source 20 is connected to control circuit 15.

A specific illustration provides an appreciation for the practicality of an arrangement in accordance with this invention. Permalloy disks 5,000 Angstrom units thick and 5 mils in diameter are deposited on opposite surfaces of a sheet of thulium orthoferrite as shown in FIG. 1. The disks define a propagation channel for domains having diameters of 3 mils as determined by a bias field of 30 oersteds. The repeat for the pattern of disks is 10 mils which provides a packing density of 100 bits per inch. A transverse field of 20 oersteds rotating at 10 kilocycles provides suitable propagation. A typical bit location size to domain diameter ratio of about three to one exists as is illustrated by the example. For domains having diameters of about one micron, densities of over one million per square inch may be realized.

The thickness and diameter of the disks, inter alia, determine the magnetic pole strength in response to the transverse fields in accordance with this invention. Accordingly, a rotating transverse field can be made of a magnitude to move domains selectively in channel C1 but not in channel C2 of FIG. 1, for example, by making the disks in channel C2 thinner than those in channel C1. A judicious choice of thickness, diameter, and transverse field strength, further, permits domain movement selectively in a relatively large number of channels. Transverse field source 17 may be taken to include apparatus for effecting such selection under the control of control circuit 15. The selection of domain propagation channels in this manner is discussed more fully in copending application Ser. No. 726,454, filed May 3, 1968 for A. J. Perneski.

A judicious choice in a variation of disk thickness also leads to an embodiment wherein the magnetic guides may be absent. When a domain transfers from one disk to the next adjacent one in a propagation channel that transfer takes place because the most intense magnetic pole concentration on one disk moves away from the domain, as the transverse field rotates, while the guide 16 restrains the domain from following as is clear from a comparison between FIGS. 3B and 3C. The most intense pole concentration on the next adjacent disk is in an appropriate position, at that time, for the domain to follow while the domain still remains under the influence of the guide. An alternative mode for effecting the desired domain transfer, then, is to reduce the pole strength of the disk at the point at which a domain is transferred from one disk to the next. This may be done, for example, by reducing the thickness of the disk at that point thus obviating the magnetic guide.

It is desirable, in accordance with this invention, that the applied external fields saturate the permalloy guide if one is employed. When the permalloy is saturated, domains themselves induce only negligible poles there. The domains, under these conditions, follow the poles induced essentially only by the external fields.

Other arrangements where in the movement of single wall domains, along channels defined by magnetic overlay patterns, is effected by pole patterns changing in response to rotating fields are described in copending application Ser. No. 732,705, filed May 28, 1968 for H. A. Bobeck.

What has been described is considered only illustrative of the principles of this invention. Accordingly, numerous other embodiments can be devised by one skilled in the art without departing from the spirit and scope thereof.

What is claimed is:

1. A domain propagation device comprising a sheet of magnetic material in which single wall domains can be moved, said material having a preferred direction of magnetization substantially normal to the plane of said sheet, means for providing a field substantially normal to the plane of said sheet and of a polarity to contract domains to a specified diameter for said domains, a plurality of discrete magnetic layers alternate ones of which are disposed on alternate surfaces of said sheet for defining a first propagation channel for domains in said sheet, said layers having geometries to permit repetitive magnetic pole variations in response to a magnetic field rotating in the plane of said sheet, and means for generating said magnetic field rotating through 360 degrees in the plane of said sheet.

2. A domain propagation device in accordance with claim 1 wherein said discrete magnetic layers comprise disks of magnetic material, also including a first magnetic guide spaced apart from the disks to a first side thereof on one surface of said sheet.

3. A domain propagation device in accordance with claim 2 wherein said means for generating comprises first and second coils oriented to generate fields in the plane of said sheet but perpendicular to one another, and means for activating said coils in a manner to generate fields consecutively angularly displaced from one another.

4. A domain propagation device in accordance with claim 2 including a second plurality of magnetic disks defining a second propagation channel, said disks defining said first channel having a geometry different from that of the disks defining said second channel for providing different pole strengths thereacross in response to said field rotating in the plane of said sheet, and means for controlling the magnitude of said last-mentioned field.

5. A domain propagation device in accordance with claim 2 including a second magnetic guide spaced apart from the disks to the second side thereof on said one surface.

6. A domain propagation device in accordance with claim 1 wherein said discrete magnetic layers comprise disks of magnetic material, said disks having geometries to provide a relatively low magnetic pole strength in prescribed portions thereof in the presence of a field rotating in the plane of said sheet.

References Cited

UNITED STATES PATENTS

| | | | |
|---|---|---|---|
| 3,148,360 | 9/1964 | Hale | 340—174 |
| 3,284,783 | 11/1966 | Davis | 340—174 |
| 3,460,116 | 8/1969 | Bobeck et al. | 340—174 |

STANLEY M. URYNOWICZ, Jr., Primary Examiner